United States Patent [19]

Trotter

[11] Patent Number: 4,500,765

[45] Date of Patent: Feb. 19, 1985

[54] FLUX RETAINER

[75] Inventor: Donald J. Trotter, Carbondale, Pa.

[73] Assignee: Santrade Ltd., Lucerne, Switzerland

[21] Appl. No.: 486,237

[22] Filed: Apr. 18, 1983

[51] Int. Cl.$^3$ .............................................. B23K 9/18
[52] U.S. Cl. .................. 219/73.21; 219/60 R
[58] Field of Search ............... 219/73, 73.2, 73.21, 219/59.1, 60 R, 60 A

[56] References Cited

U.S. PATENT DOCUMENTS 4,336,436  6/1982  Dubovetsky et al. ............ 219/60 A

FOREIGN PATENT DOCUMENTS 875273  8/1961  United Kingdom ................. 219/73

*Primary Examiner*—Roy N. Envall, Jr.
*Assistant Examiner*—Alfred S. Keve
*Attorney, Agent, or Firm*—Burns, Doane, Swecker & Mathis

[57] ABSTRACT

A flux retainer retains a granular flux upon a rotating cylindrical pipe to which a metal reinforcement layer is applied by a submerged arc welder. The flux container comprises a rectangular frame having a pair of end plates and a pair of side plates. Wheels are carried by the frame to support the frame upon the pipe surface as the pipe rotates. A pair of metal brushes are connected to the end plates and project therebelow to bear against the pipe surface and resist leakage of granular flux. The side plates each comprises a plurality of plate segments which are pivotably interconnected for rotation about an axis extending generally parallel to the pipe axis in order to change the angular relationship between the plate segments and thereby vary the distance separating the end plates. In this fashion, the flux retainer can be adapted to pipe diameters of different size. The brushes are formed of metal having a high coefficient of thermal conductivity in order to readily dissipate heat and thereby prevent destruction of the brushes.

5 Claims, 4 Drawing Figures

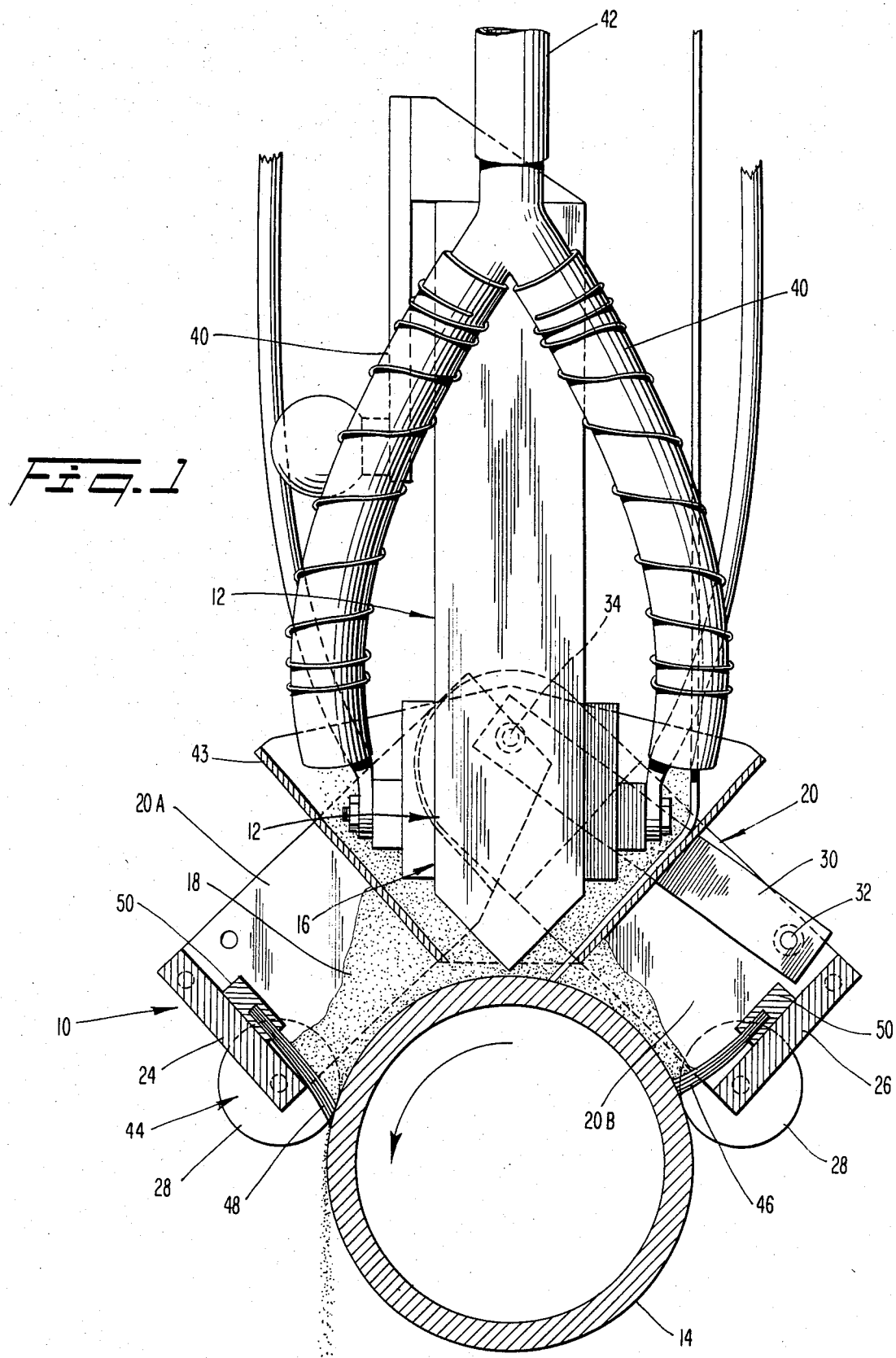

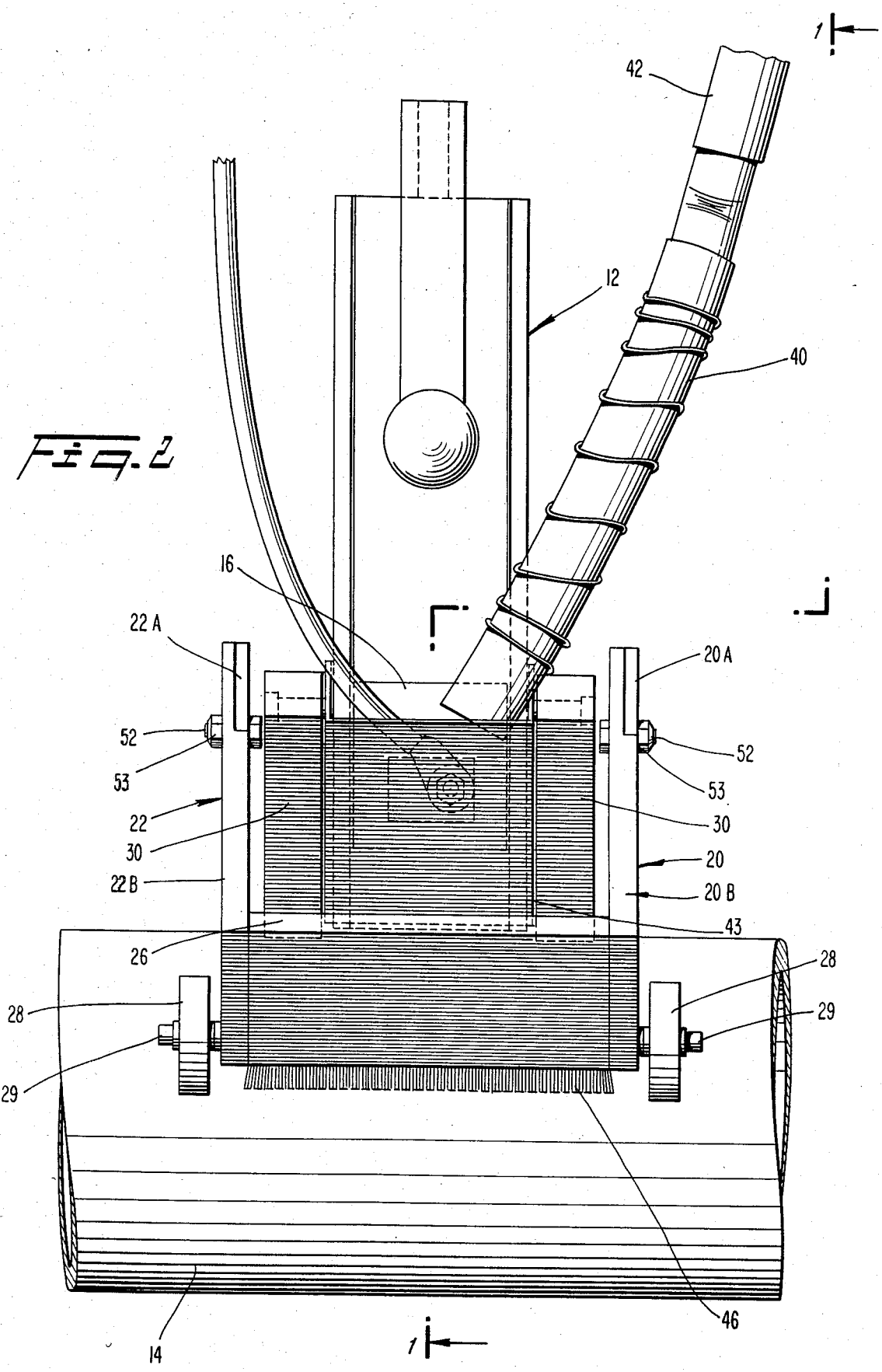

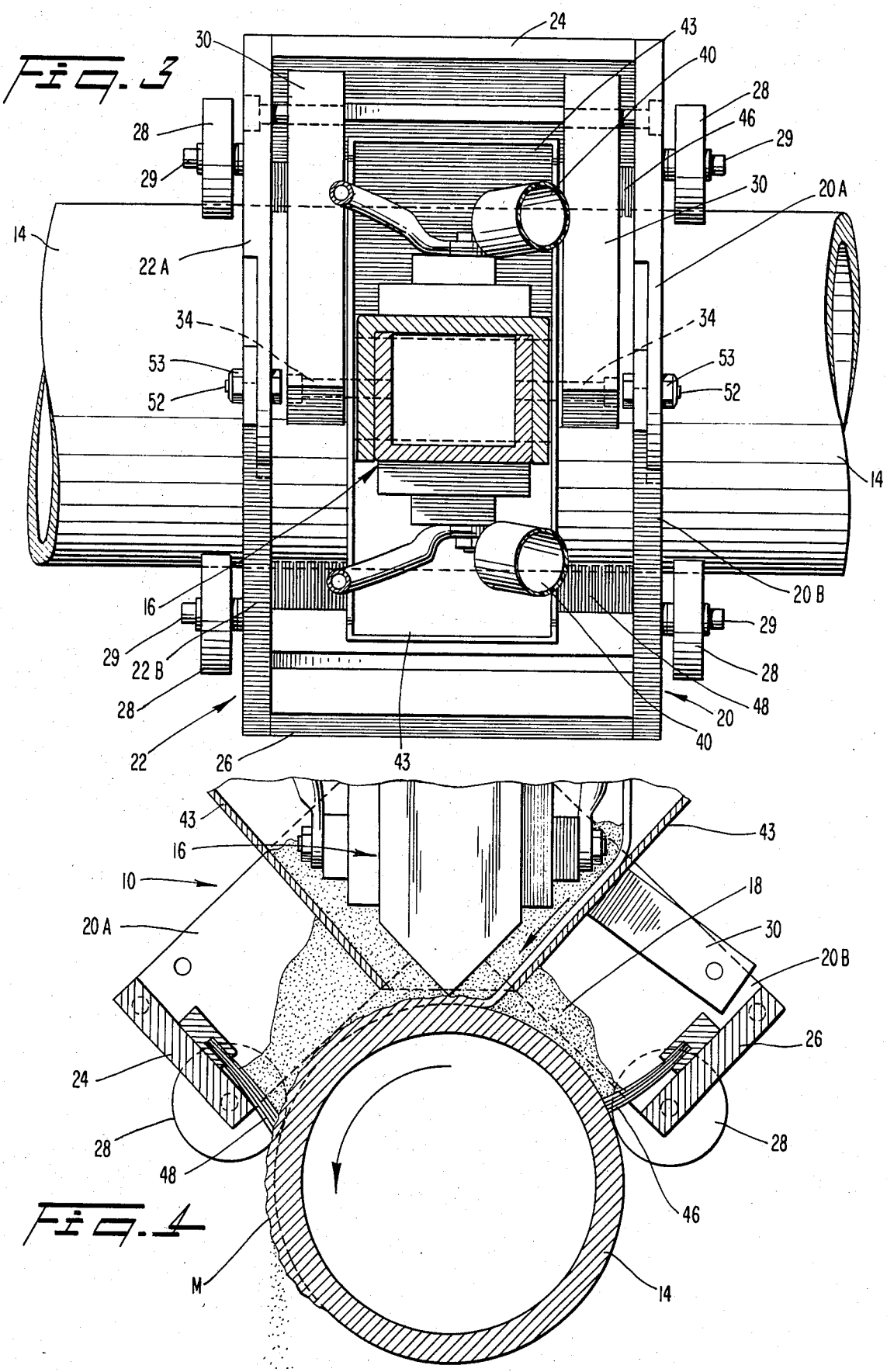

FLUX RETAINER

BACKGROUND AND OBJECTS OF THE INVENTION

The present invention relates to the submerged arc welding of cylindrical metallic workpieces to apply a metallic facing thereon.

It is conventional to provide cylindrical metallic workpieces with a facing of a harder metal for various reasons, such as, for example, to make the workpiece stronger or more resistant to corrosion. For instance, a cylinder formed of soft steel may be provided with a reinforcing facing of harder steel.

The facing is typically applied by a conventional submerged arc welding process in which an arc is generated across the workpiece and a consumable electrode formed of the facing material. The heat generated by the arc melts the surface of the workpiece and the electrode tip, whereupon a layer of the electrode material is deposited onto the workpiece. The workpiece is rotated about its own axis relative to the electrode, and the electrode tip is kept submerged within a covering of granulated flux to resist oxidation. The flux is contained within a flux retainer which rests immovably upon the workpiece as the latter rotates.

It has been heretofore proposed to form a flux retainer in the form of a box-shaped framework having four wheels at the corners, the wheels riding upon the workpiece as the latter revolves. Metal brushes are carried by the framework and are arranged parallel to the workpiece axis in wiping relationship to the surface of the workpiece to resist escape of flux along the end of the retainer. The retainer is connected to the electrode head and thus remains stationary as the workpiece revolves. A tube extends from a source of granulated flux and includes a discharge outlet communicating with the confines of the flux retainer to replenish flux which may leak from the sides of the retainer.

When using a flux retainer of the type described above, it has been necessary to provide different retainers for various workpiece diameters in order to properly locate the brushes against the workpiece surface. Furthermore, the brushes have heretofore been formed of metals such as steel and aluminum. These brushes, which are characterized by a relatively low coefficient of thermal conductivity, have not exhibited a satisfactory life span before being decimated by the high temperatures which are encountered during the welding process.

It is, therefore, an object of the present invention to provide a novel retainer for granular flux for use in a submerged arc-welding process.

An additional object is to provide such a flux retainer which is adapted for use with cylindrical workpieces of a wide variety of diameters.

A further object is to provide such a flux retainer with flux-confining brushes having a longer life span.

SUMMARY OF THE INVENTION

These objects are achieved by the present invention which relates to a flux retainer for use in retaining a granular flux upon a rotating cylindrical pipe to which a metal reinforcement layer is applied by means of a submerged arc welder. The welder includes a welder head and a conduit for delivering granular flux. The flux retainer comprises a generally rectangular frame comprising a pair of end plates and a pair of side plates. A plurality of supports are carried by the frame for supporting the frame upon the pipe surface as the pipe rotates about its longitudinal axis. The end plates extend generally parallel to the pipe axis and the side plates extend generally perpendicular to the pipe axis. Arms are joined to the frame for releasably securing the frame to the welder head. A pair of metal brushes are connected to and extend across the end plates and project therebelow to bear against the pipe surface and resist leakage of granular flux. The side plates each comprise a plurality of plate segments pivotably interconnected for rotation about an axis extending generally parallel to the pipe axis in order to change the angular relationship between the plate segments and vary the distance separating the end plate. Fasteners secure the plate segments in selected angular relationships to adapt the retainer to pipes of different diameter.

Preferably, the brushes are formed of a material having a coefficient of thermal expansion of at least 200 BTU/hr. ft. F.

THE DRAWINGS

The objects and advantages of the invention will become apparent from the following detailed description of a preferred embodiment thereof, in connection with the accompanying drawings in which like numerals designate like elements, and in which:

FIG. 1 is a cross-sectional view taken along a vertical plane along line 1—1 depicted in FIG. 2, showing the manner in which the flux retainer according to the present invention retains flux during a welding operation;

FIG. 2 is a side elevational view of the flux retainer according to the present invention as the flux retainer rests upon a rotating and translating pipe;

FIG. 3 is a plan view of the flux retainer according to the present invention as the retainer sits upon the pipe, with portions of the welder head being depicted in cross-section; and FIG. 4 is a view similar to FIG. 1 during an actual welding operation.

DETAILED DESCRIPTION OF A PREFERRED EMBODIMENT OF THE INVENTION

Depicted in FIG. 1 is a granular flux retainer 10 according to the present invention which is mounted on a conventional submerged arc-welding apparatus 12. The welding apparatus 12 is arranged to apply a metal facing to a workpiece in the form of a circularly cylindrical pipe 14 which is mounted, in conventional fashion, for rotation about its own longitudinal axis. The metal pipe is simultaneously rotated and advanced longitudinally so that the welder applies a helical strip of facing material. Eventually, virtually the entire surface of the pipe will be covered by the facing.

The conventional welder 12 includes a head 16 in which is disposed an electrode (not shown). During a welding operation, the electrode has its tip continuously submerged in a blanket of granular flux 18 of a conventional composition to resist oxidation of the applied facing. The flux blanket is confined by means of the flux retainer 10.

The flux retainer 10 comprises a generally rectangular box-like frame which includes a pair of parallel side plates 20, 22 and a pair of parallel end plates 24, 26 which interconnect the ends of the side plates 20, 22.

The side plates 20, 22 carry four free-wheeling support wheels 28 at each corner, which wheels 28 rotate about axles 29 extending parallel to the longitudinal axis of the pipe axis. The wheels 28 project below the side plates 20, 22 and are arranged to ride upon the surface of the pipe 14 as the latter is rotated and translated relative to the welder 12.

Secured to the inside walls of the side plates 20, 22 adjacent one of the end plates 26 are a pair of mounting arms 30. These arms 30 each have first and second ends. Each first end is previously mounted by a pin 32 to a respective one of the side plates 20, 22 for rotation about an axis extending parallel to the axes of the wheels. The second end of each arm 30 is pivotably mounted by a pin 34 to the welder head 16 for rotation about an axis also extending parallel to the axes of the wheels. These pins 34 of the second ends of the mounting arms are mutually aligned. With the mounting arms 30 connected to the welder head 16, the latter is positioned substantially centrally within the flux retainer 10.

The granular flux 18 is supplied by means of a pair of conduits 40 which emanate from a common supply duct 42. The discharge ends of the conduits 40 are located on opposite sides of the welding head 16. The head 16 includes a hopper 43 to which the flux is initially delivered before gravitating toward the walls of the retainer frame. Flux 18 accumulates above the pipe 14 to completely cover the reinforcement facing during its initial application and for a brief period thereafter, i.e., until rotation of the pipe causes the newly applied facing to reach the tailing end 44 of the retainer 10.

In order to contain the granular flux, brushes 46, 48 are mounted along the leading and trailing end plates 26, 24 of the flux retainer 10. Each brush comprises metallic bristles which are secured within a U-shaped carrier strip 50. The carrier strips are mounted, as by removable bolts for example, to the end plates 26, 24 so that the bristles project below the lower edges of the end plates. Preferably, the tips of the bristles project slightly below the lowermost level of the wheels 28 so as to bear against the pipe 14. A seal which resists leakage of granular flux is created by the engagement of the brushes with the pipe.

A flux retainer similar to that thus far described has been heretofore proposed in the art, as noted in the earlier background section. That flux retainer had one-piece side plates of V-shaped configuration, and the brushes were formed of steel or aluminum, i.e., of a material having a relatively low coefficient of thermal conductivity.

The flux retainer according to the present invention comprises side plates 20, 22 which are each of two-piece construction. That is, the side plates 20, 22 comprise first and second plate segments 20A,B and 22A,B which are joined together by pivot pins 52 whereby the segments are rotatable relative to one another about axes extending parallel to the axes of the wheels. The pivot is formed by a pin having a nut-type fastener 53, threadedly connected thereto. Thus, by loosening the nut, the plate segments are capable for relative angular adjustment in order to converge or separate the end plates 24, 26. In this way, the retainer can be adapted to sit upon pipes of different diameter. Thus, a flux retainer according to the present invention is capable of being used in the welding of different diameter pipes, eliminating the need to provide a wide variety of flux retainers configured to fit particular pipe diameters.

The brushes 46 of the present invention are formed of a metal having a relatively high rate of thermal conductivity, such as metals containing copper for example. Preferably, the metal has a coefficient of thermal conductivity of at least 200 BTU/hr. ft. F. As a result, the brushes are able to rapidly transmit the heat from the tips of the brushes before the tip temperature reaches the melting point of the metal. The heat is rapidly discharged into the ambient air to prevent excessive temperature build-ups along the bristles. Thus, the brushes exhibit a relatively long lifespan.

In operation, the flux retainer 10 sits upon a pipe 14 as the latter rotates and translates (see FIG. 4). A strip of metal M is applied to the surface of the pipe, the metal being covered by the layer of flux 18 which is retained by the flux retainer. The flux retainer remains stationary as the pipe rotates, and the flux is retained by the brushes 46, 48.

If it is desired to adapt the flux retainer to a pipe of different diameter, the nuts 53 are loosened, and the plate segments 28, 20B and 22A, 22B are pivoted about the axis defined by the pins 52 until the desired spacing between the end plates 24, 26 is attained.

During a welding operation, the high amounts of heat which are transmitted to the brushes 46, 48 are easily dissipated due to the high coefficient of thermal conductivity exhibited by the materials of which the brushes are made.

Although the present invention has been described in connection with a preferred embodiment thereof, it will be appreciated by those skilled in the art that additions, modifications, substitutions, and deletions not specifically described, may be made without departing from the spirit and scope of the invention as defined in the appended claims.

What is claimed is:

1. A flux retainer for use in retaining a granular flux upon a rotating cylindrical pipe to which a metal reinforcement layer is applied by a submerged arc welder which includes a welder head and a conduit for delivering granular flux, said flux retainer comprising:

a generally rectangular frame comprising a pair of end plates and a pair of side plates;

a plurality of supports carried by said frame for supporting said frame upon an upper portion of the pipe surface as the pipe rotates about its longitudinal axis, with said end plates generally parallel to the pipe axis and said side plates extending generally perpendicular to the pipe axis;

said supports being spaced apart to engage an upper portion of the pipe surface at locations disposed above the longitudinal axis of the pipe;

arm means joined to said frame for releasably securing said frame to the welder head;

a pair of metal brushes connected to and extending across said end plates and projecting therebelow to bear against the pipe surface and resist leakage of granular flux;

said side plates each comprising a plurality of plate segments pivotably interconnected for rotation about an axis extending generally parallel to the pipe axis in order to change the angular relationship between the plate segments and vary the distance separating said end plates; and fastener means for securing said plate segments in selected angular relationships to adapt the retainer to pipes of different diameter.

2. A flux retainer according to claim 1, wherein said brushes are formed of a copper-containing material.

3. A flux retainer according to claim 1, wherein said brushes are formed of metal having a coefficient of thermal conductivity of at least 200 BTU/hr. ft. F.

4. A flux retainer according to claim 1, wherein said supports comprise wheels mounted to said frame for rotation about axes extending parallel to the pipe axis.

5. A flux retainer in combination with a cylindrical pipe, said retainer retaining a granular flux upon the cylindrical pipe to which a metal reinforcement layer is applied by a submerged arc-welder as the pipe is rotated, said arc-welder including a welder head and a conduit for delivering granular flux, said flux retainer comprising:

- a generally rectangular frame comprising a pair of end plates and a pair of side plates;
- a plurality of support wheels mounted adjacent the corners of said rectangular frame for rotation about axes disposed parallel to the pipe axis for supporting said frame upon the pipe surface as the pipe rotates about its longitudinal axis, with said end plates extending generally parallel to the pipe axis and said side plates extending generally perpendicular to the pipe axis;
    said wheels being spaced apart to engage an upper portion of the pipe surface at locations disposed above the longitudinal axis of the pipe;
- a pair of arms pivotably mounted to said frame for connecting said frame to the welder head;
- a pair of metal brushes connected to and across said end plates and projecting therebelow to bear against the pipe surface and resist leakage of granular flux, said brushes formed of a metal having a coefficient of thermal conductivity of at least 200 BTU/hr. ft. F;
- said side plates each comprising first and second plate segments pivotably interconnected for rotation about an axis extending generally parallel to the pipe axis in order to change the angular relationship between said plate segments and vary the distance separating said end plates; and
- fasteners for securing said plate segments in selected angular relationships to adapt the retainer to pipes of different diameter.

* * * * *